Aug. 25, 1959     C. A. MORGAN     2,900,691
EVER SAFE PIN
Filed July 2, 1957

*INVENTOR.*

Charles A. Morgan

United States Patent Office 2,900,691
Patented Aug. 25, 1959

2,900,691

EVER SAFE PIN

Charles A. Morgan, Denver, Colo.

Application July 2, 1957, Serial No. 669,503

1 Claim. (Cl. 24—159)

This invention relates to pins and more particularly to a safety pin.

It is an object of the present invention to provide a completely safe safety pin that is constructed from a single length of spring wire so as to provide a minimum number of corners and crevices that would ordinarily accumulate quantities of dirt and grease tending to contaminate articles with which it is contacted.

Another object of the present invention is to provide a safety pin of the above type that is substantially simple in construction, normally contained in a closed position, cannot be accidentally displaced, and which requires a minimum amount of time to apply and remove.

Other objects of the invention are to provide a safety pin bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing in which.

Figure 1:
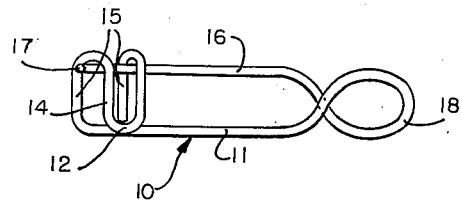
Figure 1 is a perspective view of a safety pin made in accordance with the present invention.

Referring now more in detail to the drawing, a safety pin 10 made in accordance with the present invention is shown to be constructed from a single length of flexible spring wire. This length of wire is looped about itself adjacent to the mid portion thereof to define a torsion spring base or loop 18 and a pair of diverging legs 11, 16, one such leg 11 forming a base or hasp leg, and the other such leg 16 forming a point leg terminating in a point 17 for piercing various types of fabric material.

The free end of the base leg 11 is turned back upon itself in spaced relationship to define a pair of parallel hasp portions 15. These hasp portions are then rotated about a transverse axis to define an inverted U-shaped hasp 14 for releasably engaging the point 17 of the point leg 16. As will be evident, hasp 14 has an attached side connected to hasp leg 11 and a free side connected to the attached side opposite the hasp leg 11, with the attached side and free side of the hasp extending generally at right angles to the hasp leg 11 and also having substantially the same height. Also, the hasp has an open end adjacent the hasp leg 11 and the sides of the hasp are spaced apart a distance to freely receive the point leg 16.

Figure 4:
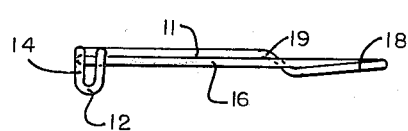
Figure 4 is a top plan view of the safety pin shown in Figure 1.
Figure 5:
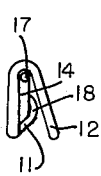
Figure 5 is an end elevational view of the safety pin shown in Figure 4.

As is more clearly shown in Figures 4 and 5, the legs are so rotated to form the torsion spring 18 and the base leg 11 may be offset as shown at 19 to permit the pin point leg 16 to extend between the adjacent portion of the torsion spring loop and the parallel hasp portions 15.

Also, as shown in Fig. 1, the point leg 16 crosses the hasp leg 11, in the torsion loop 18, on the same side as the attached side of the hasp. This naturally urges the point leg 16 into frictional engagement with the parallel hasp portions 15 and away from the free end of the inverted U-shaped hasp 14 which would effect the opening of the pin.

Figure 2:
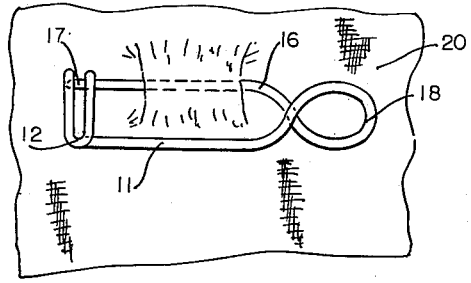
Figure 2 is a side elevational view of the safety pin in an operative position.
Figure 3:
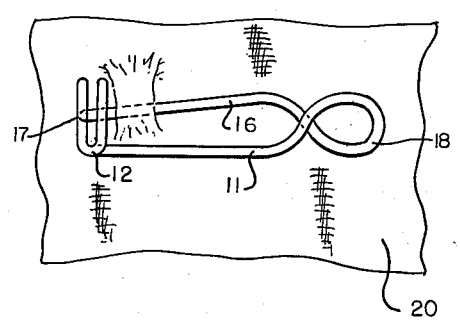
Figure 3 is a view similar to Figure 2, showing the pin in a different position of use.

In use, the pin is opened and applied to a fabric material 20 in a conventional manner. However, once the pin has been closed, it is normally biased toward a closed position so that it cannot be opened until the hasp 14 is drawn completely over the point 17 of the point leg 16. Actually, this is impossible to do unless deliberately attempted by an adult, whereby a child cannot accidentally or intentionally open the pin. However, the pin may be readily removed from the fabric without opening the pin merely by twisting and exerting a pull upon the spring portion 18 thereof. The pin must be simply rotated from the position shown in Figures 2 and 3 to a position in which the open end of the hasp engages the fabric and the fabric will exert a pull upon the point leg 16, due to the substantially equal heights of the hasp sides, in a direction towards the open end of the hasp 14. In the position, it will be noticed that the pin point is beneath the hasp portions, whereby a pull upon the torsion spring 18, in a longitudinal direction away from the hasp 14, will cause the cloth to pull the pin in a downward direction enough to clear the hasp, whereby the cloth will slip through the head or hasp leaving the point still locked in the hasp after it has been removed. It will also be noticed that the point is at all times maintained within the confines of the hasp so that the child cannot be accidentally scratched or injured thereby.

While various changes may be made in the detail construction, it shall be understood that such changes shall be within the spirit and scope of the present invention as defined by the appended claim.

What I claim as new and desire to protect by Letters Patent of the United States is:

A safety pin comprising a flexible wire looped about itself to provide a single, generally circular torsion loop at one end of said pin, with the wire extending from said loop as a hasp leg and a point leg, and extending longitudinally from said loop in spaced relation and in the same general direction, the opposite end of said point leg being provided with a point for piercing a fabric material and the opposite end of said hasp leg being provided with a generally U-shaped hasp extending generally at right angles to said hasp leg and having an attached side and a free side, said attached side of said hasp being connected to said opposite end of said hasp leg, said hasp sides being spaced apart at said hasp leg to form an open end and said hasp sides being connected together opposite said hasp leg, said attached side and said free side of said hasp being of approximately the same height and said free side being spaced from said attached side a distance sufficient to freely receive said point leg between said hasp sides, said point leg crossing said hasp leg in said torsion loop on the same side as said attached side of said hasp, whereby said pin installed in fabric in closed position may be withdrawn from the fabric by turning said torsion loop to cause the open end of said hasp to engage said fabric and pulling on said torsion loop in a direction away from said hasp.

References Cited in the file of this patent

UNITED STATES PATENTS

| 167,328 | Gaylord | Aug. 31, 1875 |
| 195,825 | Jenkins | Oct. 2, 1877 |
| 420,811 | Lewis | Feb. 4, 1890 |
| 672,107 | Snedeker | Apr. 16, 1901 |